United States Patent [19]

Stampleman

[11] 4,132,303
[45] Jan. 2, 1979

[54] ARTICLE ACTUATED COIN DISPENSING CLOSURE FOR ARTICLE COLLECTING RECEPTACLES

[76] Inventor: Henry Stampleman, 79 Mountain Ave., New Rochelle, N.Y. 10804

[21] Appl. No.: 787,031

[22] Filed: Apr. 13, 1977

[51] Int. Cl.² ............................................. G07F 7/06
[52] U.S. Cl. ..................................................... 194/4 F
[58] Field of Search ............ 194/4 R, 4 D, 4 E, 4 G, 194/4 C, 4 F

[56] References Cited

U.S. PATENT DOCUMENTS

| 1,987,835 | 1/1935 | Love | 194/4 F |
|---|---|---|---|
| 2,999,576 | 9/1961 | Glembring | 194/4 F |

Primary Examiner—Stanley H. Tollberg
Attorney, Agent, or Firm—Charles E. Baxley

[57] ABSTRACT

A special closure for article collecting receptacles is provided having a guide for receiving articles of predetermined contour in close proximity to a coin storage chamber, and a movable linkage extending into a characterizing portion of the guide and to the base of the coin storage chamber to cause ejection of a coin with each passage of an article of predetermined shape through the guide into the receptacle. The special closure is provided with lock structure for securing it to the collecting receptacle and separate lock structure providing access to the coin storage chamber.

1 Claim, 8 Drawing Figures

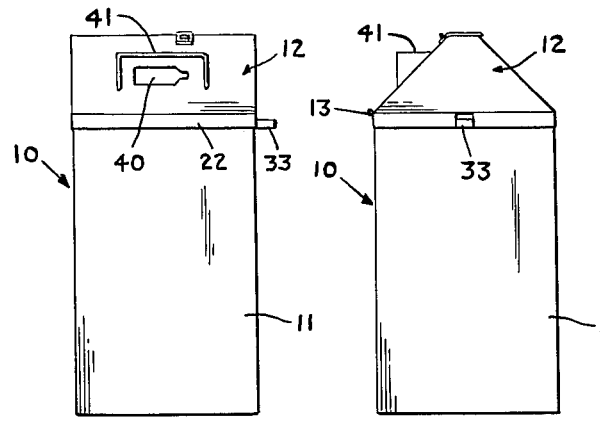
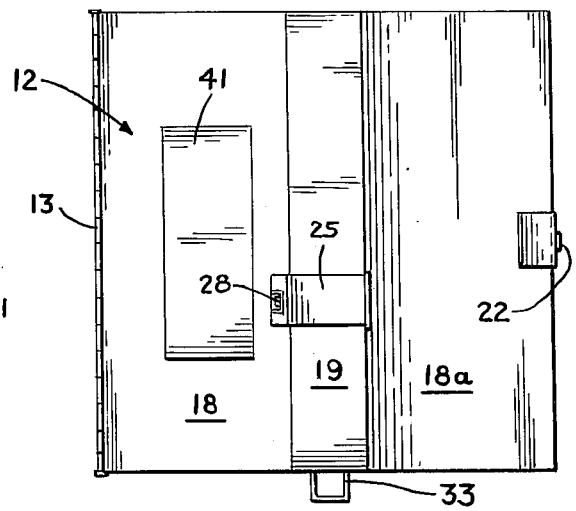
FIG. 1  FIG. 2  FIG. 3
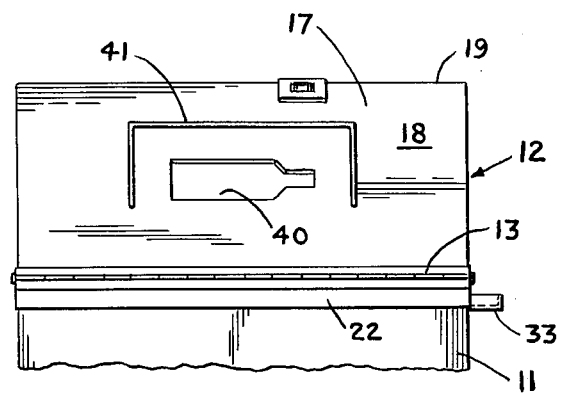
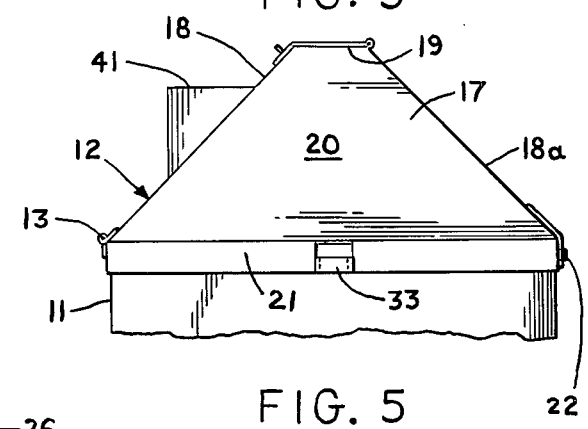
FIG. 4  FIG. 5
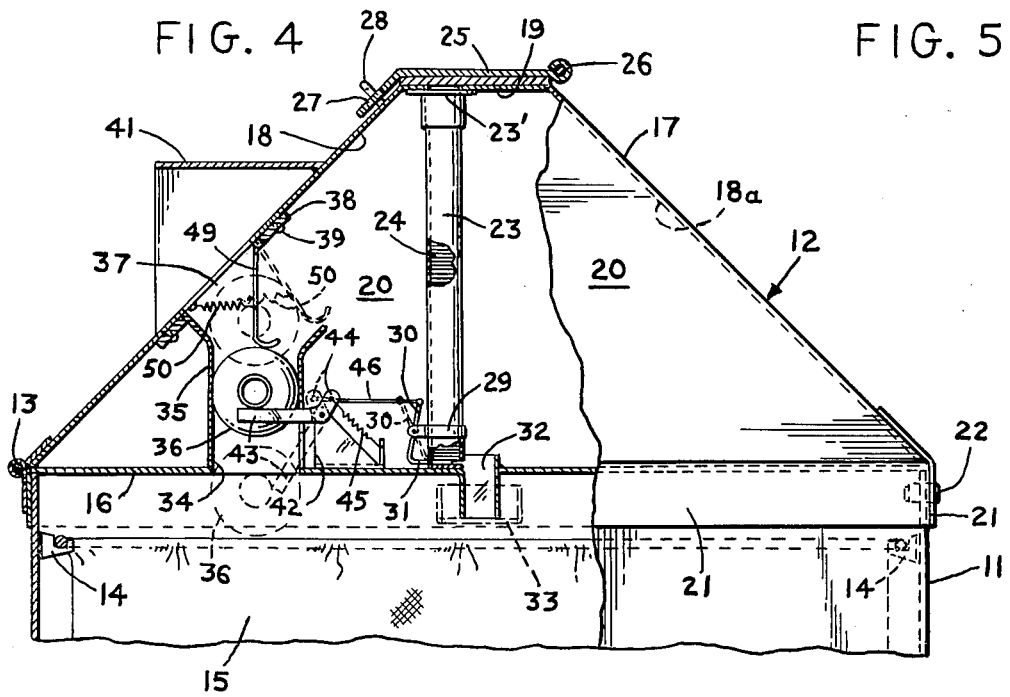
FIG. 6

ARTICLE ACTUATED COIN DISPENSING CLOSURE FOR ARTICLE COLLECTING RECEPTACLES

This invention relates to a special closure for article collecting receptacles, said closure having a guide means for receiving articles of predetermined contour in close proximity to a coin storage chamber, and a movable linkage extending into a characterizing portion of the guide means and to the base of the coin storage chamber to cause ejection of a coin with each passage of an article of predetermined shape through the guide means into the receptacle. The special closure is provided with lock means for securing it to the collecting receptacle and separate lock means providing access to the coin storage chamber.

In former times, when beverages at amusement and resort areas and the like were dispensed in returnable, reusable containers, vendors of such products generally provided means for collecting used containers, and encouraged their return with a modest refund or payment for each item returned. The present trend of using "no deposit no return" containers has virtually eliminated the time honored method of minimizing random discard of used containers with the result that discarded beverage containers and the like have become a major environmental pollutant of a both unsightly and dangerous nature.

At amusement and resort areas, and other areas where people tend to congregate under conditions to be using the one use disposable containers general trash receptacles are frequently available, but not used to the extent intended. Even if used, however, the containers become so mingled with general trash that potential salvage, or recycling value is lost or greatly reduced.

An object of the present invention is to counter this trend by providing inducement for the deposit of used containers in collection receptacles by incorporating in the closure for such receptacles automatic means for delivering a refund coin or token as each used container is added to the receptacle.

Another object is to provide guide or sensing means as part of the special closure whereby only used containers of predetermined structure or characterization will activate the coin delivery means, thereby providing in the collection receptacle a quantity of similar used containers having enhanced value for salvage, recycling, or possible reuse.

A still further object is to provide a special closure which is suitably weatherproofed for outdoor use, and which has security features which prevent unauthorized tampering with the coins stored therein and with the used containers which have been collected. Of course, the use of sinuous chutes or passageways to frustrate theft, as shown for instance in FIG. 2 of S. H. Love U.S. Pat. No. 1,987,835 which was granted on Jan. 15, 1935 for "Vending Machine" is well-known in the prior art.

In attaining these objectives the improved receptacle closure in accordance with the present invention is provided with a peripheral rim for closely engaging the upper edge of a collection receptacle and an upstanding body portion housing container guide means, coin storage means in close proximity thereto, and a movable linkage between the coin storage means and guide means whereby passage of a container through the guide means and into the receptacle imparts a coin ejecting motion at the base of the coin storage means.

The closure rim includes lock means for engaging the upper edge of the receptacle to prevent unauthorized access to the containers collected therein. The closure can be hinged to the upper edge of the receptacle or an adapter permanently secured to the receptacle; or can be separate and readily detachable from the receptacle, in which event the closure and receptacle will have interengaging means at points peripherally spaced from the lock means.

While from the standpoint of providing maximum container storage capacity the receptacle will preferably have a square or rectangular cross section, it is to be understood that the invention can be adapted to provide closure for receptacles of any cross sectional contour including conventional, essentially cylindrical, barrel-type receptacles.

The article actuated coin dispensing closure in accordance with the present invention will be more fully understood from a consideration of the following description, having reference to the accompanying drawing in which a typical adaptation of the invention has been illustrated with the various parts thereof identified by suitable reference characters in each of the views, and in which:

FIG. 1 is a front elevation view of a closure-receptacle assemblage in accordance with the invention.

FIG. 2 is a side elevation view of the assemblage shown in FIG. 1.

FIG. 3 is a somewhat enlarged top view of the closure as shown in FIGS. 1 and 2.

FIG. 4 is a front view of the closure and fragmentary receptacle enlarged to the scale of FIG. 3.

FIG. 5 is a side view of the closure and fragmentary receptacle enlarged to the scale of FIG. 3.

FIG. 6 is a side elevation view similar to FIG. 5 but further enlarged, and with part of the structure broken away to reveal inner detail.

Figure 7:
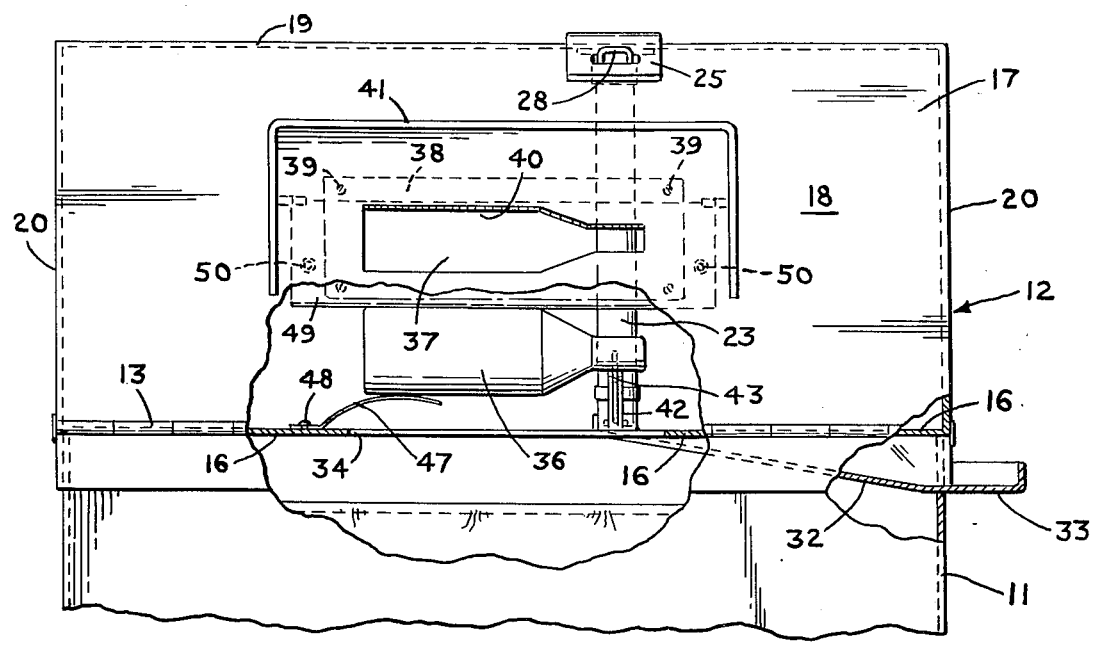
FIG. 7 is a front elevation view similar to FIG. 4, but further enlarged and with part of the structure broken away to reveal inner detail.

As shown in FIGS. 1 to 7 of the drawing the invention is incorporated in an assemblage 10 comprising a collecting receptacle 11 of rectangular cross section and a coin dispensing closure unit 12 hingedly secured to the receptacle 11 at the front of the assemblage as seen at 13. The receptacle is provided with bracket means 14 adjacent the upper inner edge thereof for suspending an article collecting bag or liner 15.

The closure unit 12 has a base plate 16 extending the full dimensions of the open end of receptacle 11 and joined to a generally domed superstructure 17 housing the inner workings of the coin dispensing closure unit. The front and rear portions 18, 18a of the superstructure have been shown as sharply inclined and terminating in a narrow top plate 19 which is parallel to the base plate 16, while the side portions 20 have been shown as parallel to each other. Extensions of the side portions 20 and of the rear portion 18a protruding below the base plate 16 provide a flange 21 which fits telescopically over the upper edge of receptacle 11, and the flange 21 at the rear of the assemblage, opposed to hinge means 13, carries lock means 22 of the key actuated type for providing a tamper-proof interlock between the flange 21 and receptacle 11.

The side portions 20 need not be parallel to each other but may be appropriately inclined. When adapting the coin dispensing for use with a round receptacle it will be apparent that the flange 21 will be of circular contour and that the angularity of the superstructure may vary considerably at different points circumferentially of the closure unit.

Centrally of the closure unit 12 and supported between base plate 16 and top plate 19 is a storage chamber 23 for stacked coins or tokens 24. The open upper end 23' of the storage chamber is closed by a cover plate 25 hinged at its one side to the superstructure as seen at 26, and having an aperture 27 at its other side engaging a loop 28 to provide a hasp assemblage which can be securely closed by any desired key or combination lock.

Secured to the lower end of storage chamber 23 by suitable mounting means 29 is a lever 30 having offset end 31 movable transversely of chamber 23 and adapted, in the movement thereof, to eject the lowermost coin 24 into inclined chute 32 which delivers the same to a pick-up station 33 externally of the flange 21 and at one side of the assemblage. As shown in FIGS. 1 to 7 the chute 32 and pick-up station 33 extend below base plate 16 requiring a notch or cut-out in the upper edge of receptacle. It will be understood, however, that in an adaptation intended for detachable mounting on a receptacle, rather than being hinged thereto as shown in FIGS. 1 to 7, the chute 32 and pick-up station 33 will be located above the base plate 16.

Spaced forwardly of the storage chamber 23, and aligned with an aperture 34 is an upstanding guide 35 shaped to closely receive a container 36 of predetermined contour, and registering with an aperture 37 in the front portion 18 of the superstructure. The aperture 37 is preferably provided by a separate plate 38, secured to portion 18 by suitable fasteners 39, and having a cut-out profile 40 as shown in FIGS. 1, 4 and 7 which closely conforms to the peripheral contour of containers 36 which are to be collected in the assemblage. By simply changing the plate 39 to one having a different cut-out contour 40, one can predetermine the particular type containers which will be accepted for delivery of a coin or token refund. The area of the aperture 37 and plate 38 is preferably protected by an appropriate hood 41 protruding from portion 18 of the superstructure.

Clearly adjacent the upstanding guide 35, and mounted on base plate 16, is a bracket 42 pivotally supporting a lever having a long arm 43 adapted to enter guide 35 and an offset short arm 44. A spring 45 extending between the bracket 42 and short arm 44 normally urges the long arm 43 into the guide 35 at a portion thereof which aligns with a characterizing portion of a container 36 passing through the guide. As seen in FIG. 7 the characterizing portion in the adaptation illustrated is the reduced neck portion of container 36. It will be understood, however, that this is purely illustrative, and that the size and location of the long arm 43 of the lever can be modified as desired to accommodate to containers of different peripheral contour.

The short arm 44 of the lever is linked to lever 30 by connecting means 46 in such manner as to impart coin ejection movement to lever 30 as a container 36 contacts and depresses lever arm 43, and it will be apparent that spring 45 must be appropriately tensioned to reset lever 30 and long arm 43 at the completion of each coin ejection to be ready for activation as the next container 36 passes through guide means 35.

To assure proper functioning of the coin release mechanism it is important that the known weight of the container 36 be effectively concentrated on long lever arm 43, suitably by providing an essentially horizontal orientation of container 36 as it engages lever arm 43. This can be accomplished in various ways, as for example by providing a leaf spring 47 secured to the base plate 16 as shown at 48 in alignment with the bottom of container 36. The resilient support provided by leaf spring 47 assures appropriate weight or force of contact of lever arm 43 by the neck of container 36 while in no way restricting the free fall of container 36 into receptacle 11 after lever arm 43 has been actuated.

As a further aid to proper feed of container 36 into the guide 35 hinged flap 49 may be located above, centrally of and longitudinally of the guide 35 as shown in FIG. 6 and having its rearward movement restricted by springs 50. The springs thus prevent a container 36 from merely "falling" into the guide 35. There is the need for application of some force or pressure by the individual seeking a coin refund, and the pressure co-acting with the movement flap 49 aids in imparting the desired horizontal orientation to the container 36.

Because all the working mechanism is contained within closure unit 12 there is no need that the closure unit be permanently or hingedly mounted to a particular receptacle 11. By slight modification of the structure of the flange 21, and having flange 21 extend around the full periphery of the closure unit 12 the closure unit can be detachably secured to the receptacle 11. One way of accomplishing this has been illustrated in FIG. 8.

Figure 8:
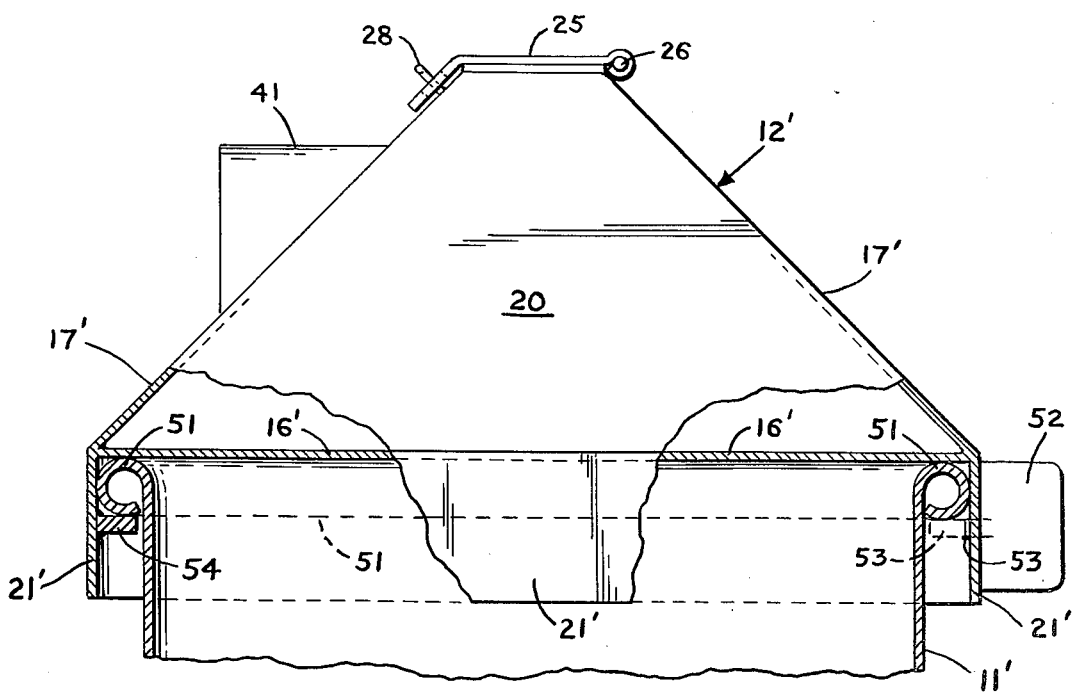
FIG. 8 is an enlarged fragmentary sectional view showing the interengagement of a detachable closure unit and associated receptacle.

As shown in FIG. 8 a closure unit 12' with base plate 16' and upstanding superstructure 17' is provided with a peripheral flange 21' extending below the base plate 16' and closely and telescopically fitting over receptacle 11' having a bead or other reinforced upper rim 51 protruding outwardly thereof. At one point on flange 21' there is mounted a lock mechanism 52 actuated by a key, not shown, to move a bolt 53 to restraining position beneath the rim 51.

At one or more points peripherally opposed to the lock means 52 flange 21' is provided with fixed, inwardly projecting means 54 to pass and fit beneath the rim 51. When the detachable closure unit is adapted for use on a rectangular receptacle the projecting means 54 can extend along the major length of the side opposed to lock mechanism 52. When the detachable closure unit is adapted for use with generally cylindrical receptacles the projecting means 54 will be diametrically opposed to the lock mechanism 52 and may be disposed along an arc of 20° to 30° or more.

In using the detachable closure unit a slight lateral movement with the lock bearing portion somewhat elevated will engage the projecting means 54 with the receptacle rim 51, whereupon lowering of the lock bearing portion permits engagement of the bolt 53 with the underside of the rim 51 to securely mount the closure unit 12' on the receptacle 11'.

Various changes and modifications in the container actuated coin dispensing closure unit as above described may occur to those skilled in the art, and to the extent that such changes and modifications are embraced by the appended claims, it is to be understood that they constitute part of the present invention.

I claim:

1. An article actuated coin dispensing closure unit for article collecting receptacles, said closure unit comprising a base plate of size and shape corresponding with the cross section of the receptacle to be associated therewith, a peripherally extending flange protruding downwardly from the base plate adapted to externally and telescopically engage said receptacle, lock means for interlocking said flange to said receptacle, a superstructure extending above said base plate and housing article receiving and coin dispensing means, said coin dispensing means being located centrally of said closure unit and comprising a vertically oriented coin storage chamber, an inclined chute adjacent the base of said chamber and extending to a coin pick-up station at one side of said closure unit, movable means for individually transferring a coin from the base of said storage chamber to said chute, guide means in said closure unit forwardly of said coin storage chamber forming a passageway having a contour profile that matches the article to be collected, said guide means extending downwardly through said superstructure to said base plate to establish a passageway to the associated receptacle, movable means extending into said guide means and linked to said movable coin transferring means in order to eject coins therefrom, lockable access means to said coin storage chamber provided at the top of said superstructure, an hinge that is peripherally spaced from said lock means for joining said closure unit to said receptacle, a plate having a profiled aperture formed therein and detachably secured to said superstructure to permit an interchange between plates having different profiled apertures in order to adapt the unit to accept and to reject the articles in response the profile of the aperture that is formed in said detachably secured plate, a spring tensioned flap hingedly mounted above, centrally of and longitudinally of said guide means providing a spring loaded and selectively openable closure for said guide means and a leaf spring having one end fixedly secured to said unit and the other, free end extending into said guide means.

* * * * *